US009052996B2

(12) United States Patent
Wittliff, III et al.

(10) Patent No.: US 9,052,996 B2
(45) Date of Patent: *Jun. 9, 2015

(54) CODE EVALUATOR TOOL WITH URGENCY INDICATOR

(71) Applicant: Service Solutions U.S. LLC, Warren, MI (US)

(72) Inventors: William W. Wittliff, III, Gobles, MI (US); Shilpi Biswas, Avon, OH (US); Jennifer Grabowski, Hinckley, OH (US); Phillip Freshour, Richfield, OH (US); Hamid Namaky, Chagrin Falls, OH (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/925,353

(22) Filed: Jun. 24, 2013

(65) Prior Publication Data
US 2013/0282229 A1    Oct. 24, 2013

Related U.S. Application Data

(63) Continuation-in-part of application No. 12/180,245, filed on Jul. 25, 2008, now Pat. No. 8,473,145.

(60) Provisional application No. 60/935,103, filed on Jul. 26, 2007.

(51) Int. Cl.
*G06F 17/00* (2006.01)
*G06F 19/00* (2011.01)
*G01M 15/02* (2006.01)
*G06F 11/32* (2006.01)
*G08B 21/16* (2006.01)
*G07C 5/08* (2006.01)
*G07C 5/00* (2006.01)

(52) U.S. Cl.
CPC .............. *G06F 17/00* (2013.01); *G07C 5/0808* (2013.01); *G07C 2205/02* (2013.01); *G07C 5/008* (2013.01)

(58) Field of Classification Search
USPC ................ 701/1, 29.1, 29.4, 29.5, 29.7, 29.9, 701/31.4, 31.6, 31.7, 31.8, 31.9, 32.1, 32.7, 701/33.2, 33.4, 33.5, 33.8, 33.9, 34.1, 34.4; 340/425.5, 438, 439
See application file for complete search history.

(56) References Cited

U.S. PATENT DOCUMENTS

| | | |
|---|---|---|
| 6,236,917 B1 * | 5/2001 | Liebl et al. .................... 701/32.8 |
| 2006/0211410 A1 | 9/2006 | Deniau et al. |
| 2007/0073459 A1 * | 3/2007 | Webster et al. ................. 701/29 |
| 2008/0140571 A1 | 6/2008 | Inbarajan et al. |
| 2009/0006476 A1 * | 1/2009 | Andreasen et al. ......... 707/104.1 |
| 2009/0055045 A1 | 2/2009 | Biwas et al. |
| 2009/0125178 A1 * | 5/2009 | Wilson ........................... 701/33 |
| 2011/0224866 A1 | 9/2011 | Chen |
| 2012/0158276 A1 | 6/2012 | Kim et al. |

OTHER PUBLICATIONS

International Search Report dated Oct. 29, 2014 for PCT/US2014/043910 filed Jun. 24, 2014.

* cited by examiner

*Primary Examiner* — Thomas Tarcza
*Assistant Examiner* — Edward Pipala
(74) *Attorney, Agent, or Firm* — Baker & Hostetler LLP (57) ABSTRACT

A diagnostic tool and method are provided wherein the diagnostic tool can be configured to communicate a message including indicators to indicate the condition of the vehicle using a database and the DTCs present in the vehicle. The message can indicate for each DTC retrieved from the vehicle, the level of repair urgency and whether the vehicle can be driven without damaging the vehicle through one or both of a display and a speaker.

20 Claims, 6 Drawing Sheets

CODE EVALUATOR TOOL WITH URGENCY INDICATOR

RELATED APPLICATIONS

The present invention is a continuation in part of U.S. Non-provisional application Ser. No. 12/180,245, filed on Jul. 25, 2008, which claims priority to U.S. Provisional Application No. 60/935,103, filed on Jul. 26, 2007, the contents of both which are relied upon and incorporated herein.

FIELD OF THE INVENTION

The present invention relates generally to an automotive diagnostic tool. More particularly, the present invention relates to a diagnostic tool with urgency indicators.

BACKGROUND OF THE INVENTION

Recently manufactured vehicles are equipped with a special system called On-Board Diagnostic II (OBD II). OBD II monitors all engine and drive train sensors and actuators for shorts, open circuits, lazy sensors and out-of-range values as well as values that do not logically fit with other power train data. Thus, OBD II keeps track of all of the components responsible for emissions and when one of them malfunctions, it signals the vehicle owner by illuminating a Maintenance Indicator Lamp (MIL), such as a check engine indicator. It also stores Diagnostic Trouble Codes (DTCs) designed to help a technician find and repair the emission related problem. OBD II also specifies the means for communicating diagnostic information to equipment used in diagnosing, repairing and testing the vehicle.

An illuminated MIL means that the OBD II system has detected a problem that may cause increased emissions. A blinking MIL indicates a severe engine misfire that can damage the catalytic converter. The MIL is reserved for emission control and monitored systems and may not be used for any other purpose. The "Check Engine," "Service Engine Soon" or other "engine symbol" message is typically used as an MIL indicator.

Although the MIL is helpful to a driver in that it lets the driver know that there is an issue with the vehicle, the driver, however, may not know if the problem is serious or not. Accordingly, it is desirable to provide a method and apparatus that include recommendations to the driver regarding the stored diagnostic trouble code (DTC).

SUMMARY OF THE INVENTION

The foregoing needs are met, to a great extent, by the present invention, wherein in one aspect an apparatus is provided that in some embodiments allows a diagnostic tool to use an indicator to indicate the status of the vehicle based on DTCs and recommend a course of action. The indicator may be sent from the diagnostic tool to a remote device, such as a smart phone for display or to a vehicle's audio and visual system. Alternatively, the diagnostic tool may send the indicator to the smart phone, which in turns sends it to the vehicle's audio and/or visual system.

In one embodiment, a diagnostic tool for diagnosing a vehicle is disclosed. The diagnostic tool which can include: a processor that processes a diagnostic data from the vehicle; a memory that stores a database that is used to indicate a condition of the vehicle; wherein the database includes a plurality of stored diagnostic trouble codes (DTCs) and a level of urgency corresponding to each of the stored DTCs, wherein the corresponding level of urgency is determined from a pool of information related to vehicle service; a connector interface that connects the diagnostic tool to a data link connector in the vehicle; a signal translator that allows the diagnostic tool to communicate with the vehicle in at least one communication protocol; a wireless communication component configured to communicate with a wireless device; and a housing surrounding the processor, the memory, the connector interface, and the wireless communication component, wherein; the wireless device is in communication with one or both of a display and a speaker in the vehicle to provide, to a user, an indicator that indicates the level of urgency corresponding to a retrieved DTC, and the indicator is distinct for each of the multiple levels of urgency and indicates an action corresponding to that level of urgency.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present disclosure provides an apparatus, such as a scan tool and method that indicate and recommend a course of action when the MIL light is illuminated in the vehicle.

Figure 1:
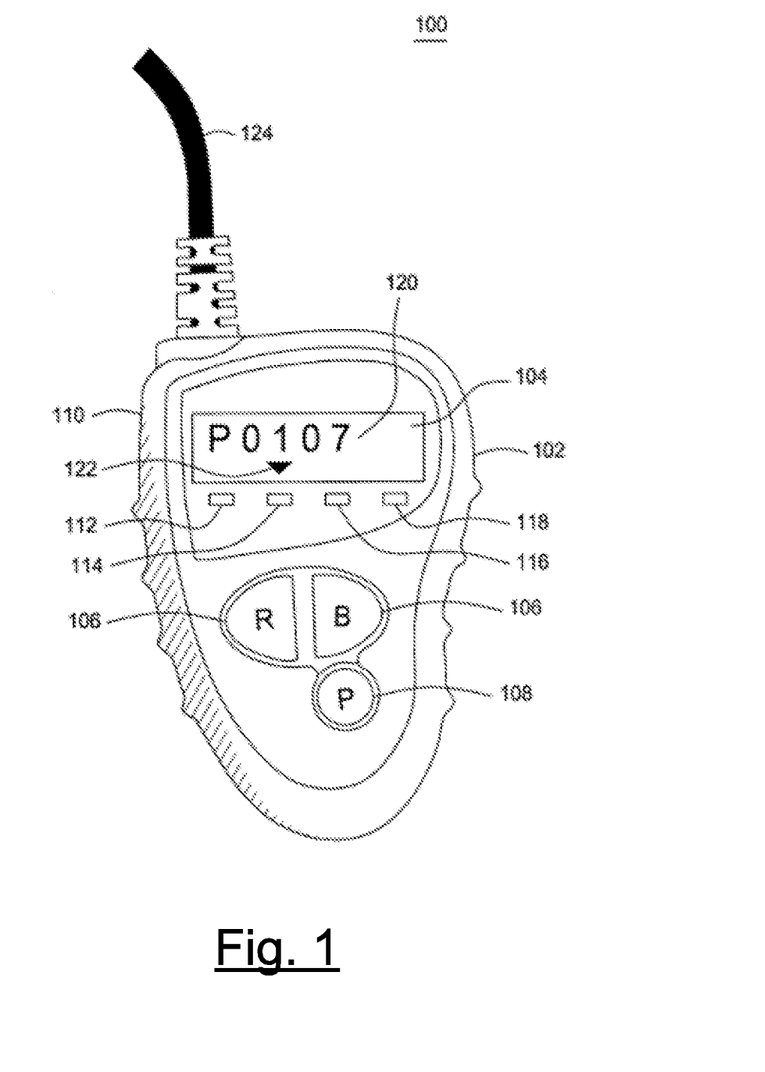
FIG. 1 illustrates the front view of an exemplary diagnostic tool according to some aspects of the disclosure.

An exemplary embodiment of the present inventive apparatus is illustrated in FIG. 1. In particular, FIG. 1 is a front view illustrating a diagnostic tool 100 according to an embodiment of the disclosure. The diagnostic tool 100 can be any computing device such as a scan tool or code reader, which is capable of communicating with a vehicle's data link connector (DLC). The DLC allows the diagnostic tool 100 to communicate with the vehicle's various diagnostic systems including OBDII. The diagnostic tool 100 includes a housing 102 to house the various components of the diagnostic tool 100, such as a display 104, a user interface 106, a power key 108, a universal serial bus (USB) 110, a connector interface 124 and an optional card reader (not shown). The housing 102 includes protrusions along the side for better gripping by the user. The protrusions can be made from an elastomeric material in order to provide a comfortable gripping surface for a user.

The display 104 can be any display, for example, a liquid crystal display (LCD), a video graphics array (VGA), a touch display (which can also be a user interface), etc. The display 104 is capable of providing a message to a user, for example, by displaying words and indicators (triangle as shown) to indicate and recommend an action based on the stored code in the OBDII. The words may include "OK," which may mean that it's OK to continue driving or "Attention," which may mean repairs may be needed within a few days (five day maximum). The words may also include "Caution," which may mean get to a repair shop, for example, within two days to avoid further damage to the vehicle or "Urgent," which may mean immediate repair is required to prevent further damage. The indicators also indicate to the user if the vehicle is drivable without potential damage to the vehicle. The retrieved DTC 120 may be displayed on the display 104.

In some embodiments, alternatively or in addition to the display, a speaker (not shown) may be used to provide the message to the user. One or both of the display 104 and the speaker (not shown) may be included as part of the diagnostic tool 100 and/or in a wireless device 400 that communicates wirelessly with the diagnostic tool 100. The speaker may emanate a sound, such as chirp or siren for example that indicates to the user the corresponding level of urgency similar to the arrow indicator or the words. Alternatively or in addition to, according to another embodiment, the diagnostic tool 100 or wireless device 400 may similarly provide any type of tactile feedback including, for example, vibrations to convey the same information as the arrow indicator, the sound and/or the words. The vibration may range from slow, for example for "Attention" to fast for "Urgent." Similarly, vibration mechanism may also be placed in various parts of the vehicle, such as a steering wheel, a mirror, a seat (driver or passenger or both) or any other part of the vehicle to similarly provide the same information as the arrow indicator, the speaker or the words.

The indicators can provide similar information as the words. For example, the arrow indicator 122 can be displayed to point to a color indicator (112-118) under the display 104. The color indicator 112 may be "Green," which may mean that it's OK to continue driving or "Yellow," 114 which may mean repairs may be needed within a few days (five day maximum). Other colors can include "Orange," 116 which may mean get to a repair shop within two days to avoid further damage to the vehicle or "Red," 118 which may mean immediate repair is required to prevent further damage. The color indicator 112 may be provided on a surface of the diagnostic tool 100. In other embodiments, the color indicators (112-118) may be in the form of lights indicator or LED or single LED that changes to the appropriate color. The lights indicators may be steadily lit or may flash to indicate the level of urgency. In another embodiment, the entire or part of the display 104 may display the indicated color. In still another embodiment, the colors indicators may be displayed on the display 104. Each of the DTC retrieved from the vehicle will have its own indicator. By having each DTC matched to an indicator, more accurate information can be known then simply summarizing the DTCs and indicating only one color as to a condition of the vehicle.

The indicators can also be via sound ranging from low to high depending on the indication needed or by vibrations (slow to fast). The indicators described herein can all be used or only some be used. For example, only "Red" 118 and "Yellow" 114 can be used. Other combinations are also possible including both sound and colors, both words and vibration and other combinations. Additionally in other embodiments, numbers may be used such as 1-4 (1 being OK and 4 being urgent or vice versa). It should be noted that the words, sounds, vibrations, numbers or indicators are recommended actions but that the user should have the vehicle checked out by a qualified technician as soon as possible after the MIL light is illuminated.

The user interface 106 allows the user to interact with the diagnostic tool 100 in order to operate the diagnostic tool 100 as desired. The user interface 106 can include function keys, arrow keys or any other type of keys that can manipulate the diagnostic tool 100 in order to operate various menus that are presented on the display 104. For example, the user interface 106 can include an "R" button in order to read any stored code in the OBDII and a "B" button to go back to a previous screen. Additionally, the "R" button may also act as a scroll function to scroll down when, for example, held down during use or pressed again and the "B" button to scroll up when held down during use or pressed again. In the scroll function, the next or previous code may be displayed including the respective color indicators 112. The buttons, however, can be programmed for any functions desired by the user including an erase code or reset MIL function. The user interface 106 can include an input device such as a mouse or any other suitable input device, including a keypad, or a scanner. The user interface 106 can also include numbers or be alphanumeric. The power key 108 allows the user to turn the diagnostic tool 100 on and off, as required.

The USB connections allows the diagnostic tool 100 to communicate with other devices including another computing device such as a smart phone, a desktop or laptop computer. This will allow the diagnostic tool 100 to be updated as needed including any software or database updates. Alternatively or in addition, the diagnostic tool 100 can be updated wirelessly, for example via a cloud based database 475 (shown in FIG. 2), or via the optional card reader. The DTC obtained from the vehicle may also be downloaded to another computing device for additional diagnosis.

The connector interface 124 allows the diagnostic tool 100 to connect at a first end to an external device, such as an ECU of a vehicle via the DLC. The second end is connected to the diagnostic tool 100. The second end may be removable in one embodiment and in another embodiment is not removable. The DLC can provide power to the diagnostic tool 100 via one of the pins when connected to the vehicle. Thus, the diagnostic tool 100 can be powered by the vehicle's battery or by its own power source (such as internal batteries or connected to an A/C plug).

Figure 2:
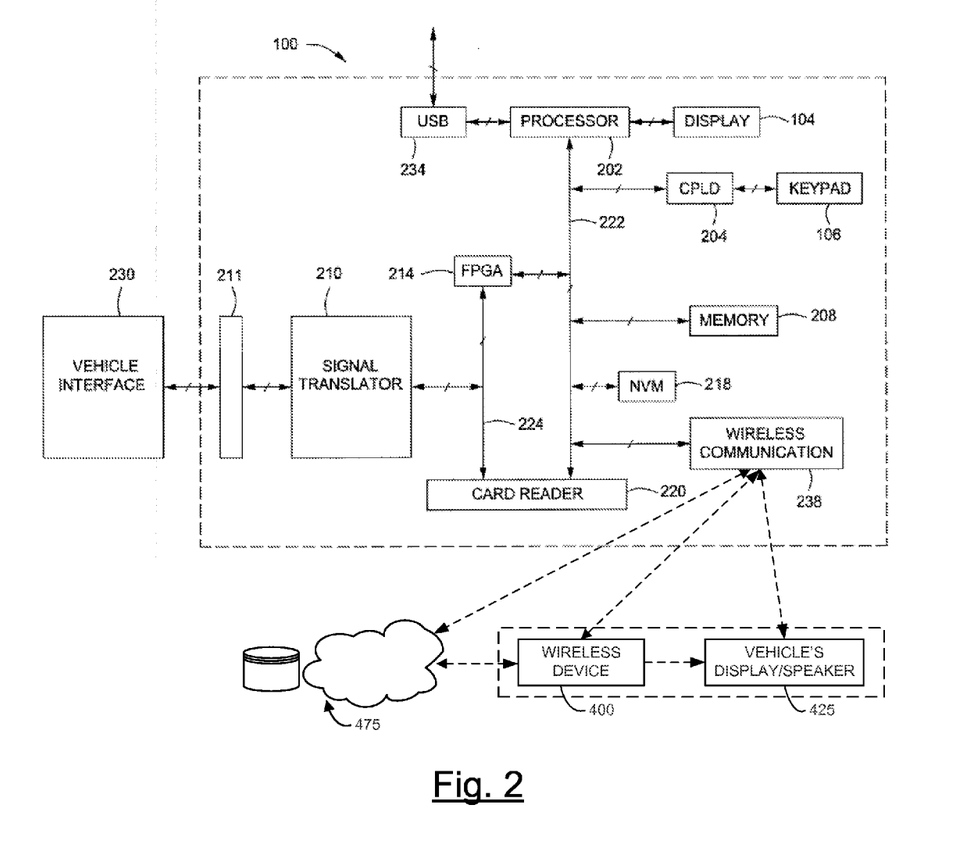
FIG. 2 is a block diagram illustrating exemplary components of a diagnostic tool according some aspects of the disclosure.

Referring now to FIG. 2, a block diagram illustrating exemplary components of a diagnostic tool 100 is depicted. In FIG. 2, the diagnostic tool 100 according to an embodiment of the disclosure includes a processor 202, a field programmable gate array (FPGA) 214, a first system bus 224, the display 104, a complex programmable logic device (CPLD) 204, the user interface 106 in the form of a keypad, a memory subsystem 208, an internal non-volatile memory (NVM) 218, a card reader 220 (optional), a second system bus 222, a connector interface 211, a selectable signal translator 210, a USB connector 234, and wireless communication circuit 238. A vehicle communication interface 230 is in communication with the diagnostic tool 100 through connector interface 211 (124 in FIG. 1) via an external cable (not shown).

Selectable signal translator 210 communicates with the vehicle communication interface 230 through the connector interface 211. Selectable signal translator 210 conditions signals received from an ECU unit through the vehicle communication interface 230 to a conditioned signal compatible with diagnostic tool 100. Selectable signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Selectable signal translator 210 is also coupled to FPGA 214 and the card reader 220 via the first system bus 224. FPGA 214 transmits to and receives signals (i.e., messages) from the ECU unit through selectable signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database (discussed herein) can include data for use with the indicators (discussed herein). The database can also be stored on an external memory, such as a compact flash card, cloud based database 475, or other memories in the optional card reader.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

Wireless communication circuit 238 communicates with the processor 202 via second bus system 222. The wireless communication circuit 238 can be configured to communicate to RF (radio frequency), satellites, cellular phones (analog or digital), Bluetooth®, Wi-Fi, Infrared, Zigby, Local Area Networks (LAN), WLAN (Wireless Local Area Network), or other wireless communication configurations and standards. The wireless communication circuit 238 allows the diagnostic tool 100 to communicate with other devices wirelessly. The wireless communication circuit 238 can include an antenna component built therein and being housed within the housing 102 or can be externally located on the housing 102. The wireless communication c circuit 238 can be used to communicate with one or more wireless device(s) 400 including, for example, a smart phone, a Personal Digital Assistant (PDA), a tablet, a vehicle's onboard computer, smart mirror, vehicle's audio and visual system 425, a Global Positioning System (GPS), and the like. Alternatively or in addition, in some embodiments the wireless communication circuit 238 can communicate with a cloud based database 475.

The information in the database that is used with the indicators can be pooled from various sources including SAE J2012. This document is intended to define standardized Diagnostic Trouble Codes (DTCs) that On-Board Diagnostic (OBD) systems in vehicles are required to report when malfunctions are detected and includes DTC format and a standardized set of DTCs and descriptions. General guidelines are offered for code number assignments, but no definitions are provided.

Typically, the DTC will be assigned by the manufacturer to be associated with a vehicle fault and then is linked to a definition. The definition may include some or all of the following information: (1) conditions for running the monitor that stores the DTC (enabling criteria); (2) conditions for setting the DTC in memory (code set criteria); (3) actions taken (fail safe or substitution values); and (4) code priority (MIL and DTC as opposed to DTC only with no MIL). Usually, no DTC assigned by a manufacturer to a vehicle fault is purely generic.

It should be noted that DTCs come with some limitations. For example, some vehicle problems will not store a DTC, such as a component that is binding mechanically, but passes the electrical test may not store a code. Some DTC-related faults are asymptomatic such as a gutted catalyst that may have no effect on driveability or an evaporative emission system fault that illuminates the MIL may allow hydrocarbons to escape into the atmosphere, but has no readily noticeable symptoms. DTC numbers and their descriptors can be wrong such as a transmission DTC may be stored if a critical sensor input to the TCM is missing. DTC may not properly identify the extent of the problem, for example, a short in a shared reference voltage circuit may affect multiple sensors even though only one fault is identified by DTC. A vehicle with multiple faults may not store multiple codes so that the existence of additionally faults will not be detected until the original fault is corrected and the DTC is erased. Multiple vehicle faults may be detected and multiple DTCs stored for a problem that is not properly identified by the onboard monitors or described by a DTC, such as when a voltage drop in a common ground connection can disrupt multiple circuits. These are but examples of limitations that exist in using the DTCs.

Additional resources include aftermarket repair databases, aftermarket code reference books, trade journal articles, vehicle repair manuals, white papers, presentations, aftermarket and OEM websites, aftermarket and OEM technical trainers, and practical experience from working technicians. The data and code used for the database can compiled based on experiences and the documents described herein.

Examples of the database include:

| Code/DTC | DTC Description | DTC Alert Level | Component Most Likely to be Involved or Affected | Possible Symptoms | Causes |
|---|---|---|---|---|---|
| P0004 | Fuel Volume Regulator Control Circuit High | 1 | Wiring/short to B+/regulator/control solenoid | Decreased engine performance and fuel economy-increased tailpipe emissions, possible no-start | High voltage in regulator or circuit, possible open ground or short to voltage |
| P0016 | Crankshift Position - Camshaft Position Correlation Bank 1 Sensor A | 1 | Wiring/CKP/CMP sensors or mechanical problem | Decreased engine performance and fuel economy-increased tailpipe emissions | CMP/CKP (camshaft/crankshaft) timing, CMP/CKP sensor problem or wiring, PCM |
| P0261 | Cylinder 1 Injector Circuit Low | 2 | Injection/short to ground/PCM | Decreased engine performance and fuel economy-increased tailpipe emissions-rough running-misfire | Injector or circuit/PCM short to ground |
| P0276 | Cylinder 6 Injector Circuit Low | 2 | Injection/short to ground/PCM | Decreased engine performance and fuel economy-increased tailpipe emissions-rough running-misfire | Injector or circuit/PCM short to ground |
| P250F | Engine Oil Level Too Low | 3 | Low oil - mechanical problem - oil pressure switch - PCM | Engine damage from low oil pressure | Low oil - mechanical problem - oil pressure switch - PCM |
| P2672 | Injection Pump Timing Offset | 3 | Injection Pump or controlling module | Possible reduced or erratic engine performance - may adopt a fail-safe mode of operation | Incorrect engine pump timing offset |

The alert level can be used to appropriately assign the indicators. For example, alert level 1 may be associated with the "yellow 114" indicator, alert level 2 may be associated with the "orange 116" indicator and alert level 3 may be associated with the "red 118" indicator. Other association between the alert level and the color indicators 112 may be used.

Figure 3:
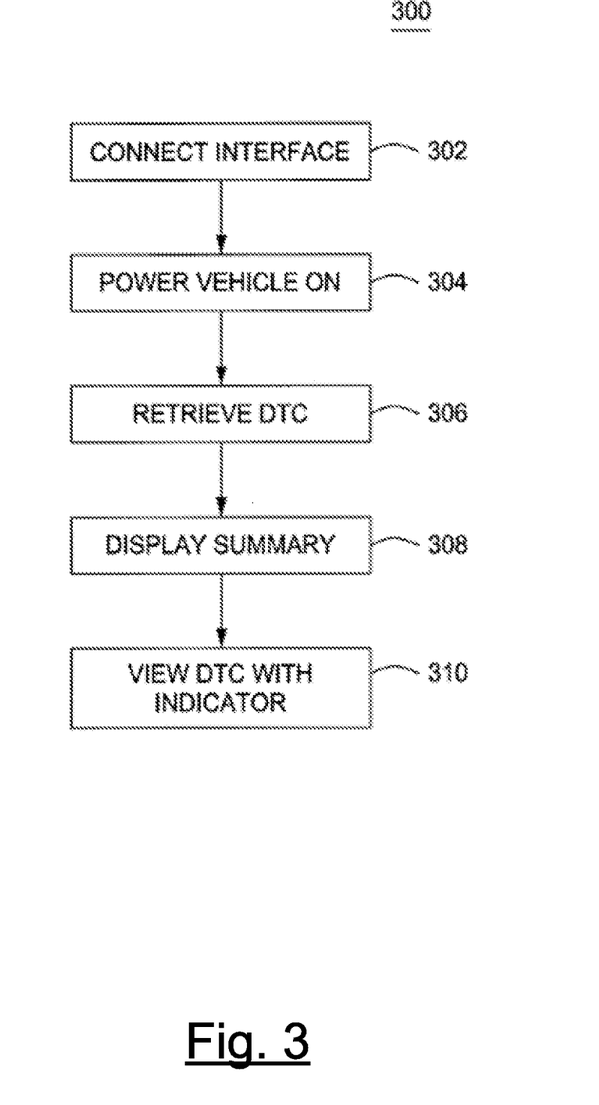
FIG. 3 illustrates a flow chart with exemplary method steps according to some aspects of the disclosure.

FIG. 3 illustrates a flow chart 300 according to an embodiment of the disclosure. At step 302, the user connects the connector interface 124 to the vehicle's DLC. At step 304, the user turns on the vehicle, which can provide power to the tool 100. In other embodiments, the power is provided by the diagnostic tool's 100 other power source. At step 306, the diagnostic tool 100 can automatically retrieve any DTCs that have been set in the vehicle. If the diagnostic tool 100 does not automatically read the DTCs from the vehicle, the user can manually press the "R" button to retrieve the DTCs. If the link fails or if there is no communication with the vehicle then a message can be displayed, such as "ERROR" or can toggle between the message "LINK" and "ERROR." At the step 308, a summary screen 308 can notify the user as to how many error codes were found or if none were found. If none were found, a message, such as "NO CODES" can appear and the arrow indicator 122 can point to the "Green" indicator. At step 310, the user can view the various retrieved DTC by pressing the "R" or "B" button as previously described. The DTC code can be shown on the display 104 while the arrow indicator 122 indicates the corresponding color indicator 112-118. The user can then press "R" or "B" to continue to scroll to the next code, if any. Each DTC will have its own urgency level indicator.

Figure 4:
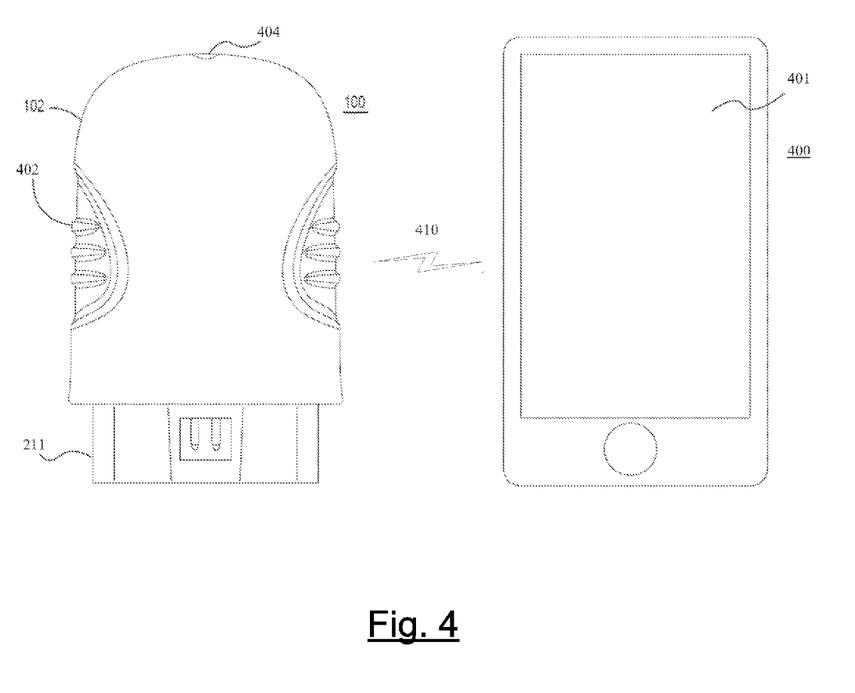
FIG. 4 illustrates another exemplary embodiment of a diagnostic tool according to some aspects of the disclosure.

FIG. 4 illustrates another exemplary embodiment of a diagnostic tool 100 according to some aspects of the disclosure. In particular, the present exemplary diagnostic tool 100 can implement an external display 401 via a wireless connection 410 using the wireless communication circuit 238. An LED indicator 404 can be included in the diagnostic tool 100 to indicate when a wireless connection 410 has been established. For example, a blue light may blink during a Bluetooth connection between the diagnostic tool 100 and a wireless device 400. The wireless device 400 may include, for example, a smart phone, a Personal Digital Assistant (PDA), a tablet, a vehicle's onboard computer, the vehicle's audio and visual system 425, a smart mirror (GM's Onstar Mirror) or any mirror that can indicate via lights, sound, vibration or display, a Global Positioning System (GPS), and the like.

The wireless device 400 can include a touch screen display 401 that may be used as the user interface 106 and/or message display 104 for the diagnostic tool 100. In addition, the wireless device 400 may include a speaker (not shown) that may be used to play the messages to the user according to the DTC. Alternative, the wireless device 400 may have a vibration means as described herein.

Protrusions 402 along the sides can be provided in the housing 102 for better gripping by the user. The protrusions 402 can be made from an elastomeric material in order to provide a comfortable gripping surface for a user. In some embodiments the protrusions 402 can be placed on parallel side buttons forming part of the housing 102 configured to be used to allow a user to connect and disconnect the connector interface 211 to/from the vehicle communication interface 230.

Figure 5:
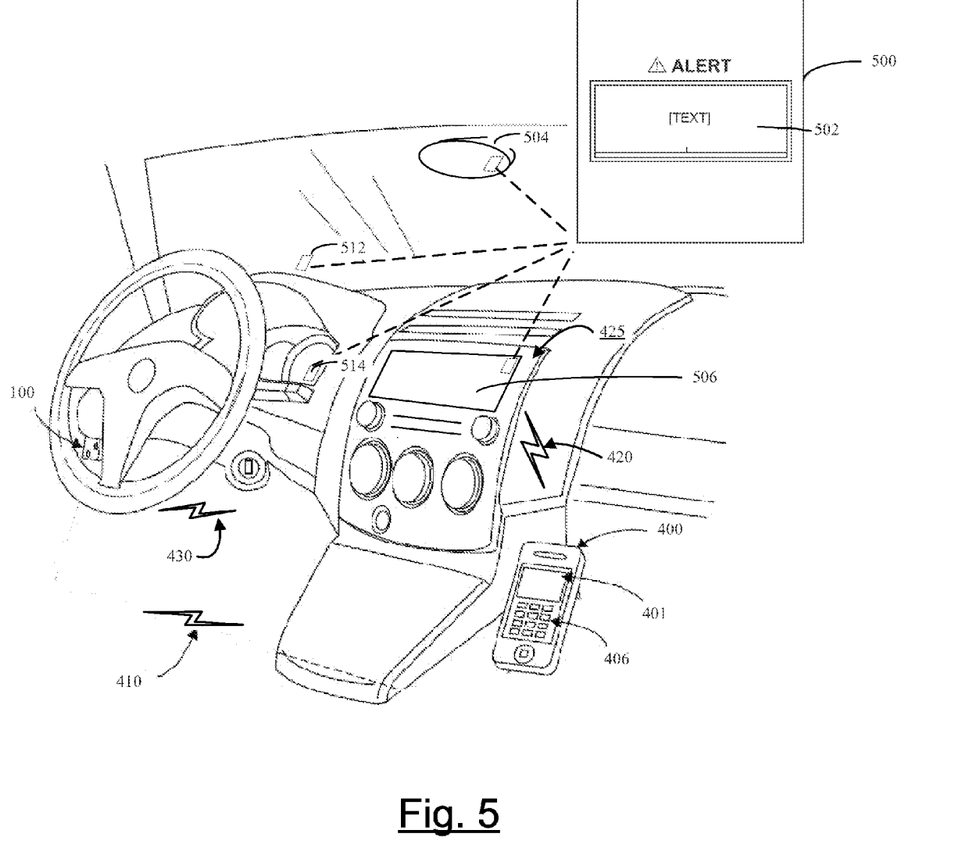
FIG. 5 illustrates yet another exemplary embodiment being implemented according to some aspects of the disclosure.

FIG. 5 illustrates yet another exemplary embodiment being implemented according to some aspects of the disclosure. A wireless device 400 including a keypad user interface 406 and a display 401 can communicate wirelessly 410 with the diagnostic tool 100 through the wireless communication circuit 238. In alternative embodiments, a wireless device 400 does not have to be implemented and a wireless communication 430 may be formed between the diagnostic tool 100 and the vehicle's audio and visual system 425 or the vehicle's onboard computer (not shown). Additionally, a wireless communication 420 may be made between the wireless device 400 and the vehicle's audio and visual system 425 or the vehicle's onboard computer.

As shown in FIG. 5, the diagnostic tool 100 is coupled to the data link connector (or vehicle interface 230) of the vehicle in order retrieve any DTCs that are set in the electronic control unit. Once retrieved, the diagnostic tool can convey the urgency indicator information to various devices or systems.

One such system is the vehicle's audio and visual system 425, that may include display 506 (touch screen) for one or more of the vehicle's navigation system, climate control system, entertainment system including video and audio capabilities and/or any other vehicle control system that can be linked to one or more on board computer that includes electronic components capable of wireless or wired communication. The vehicle's audio and visual system 425 may receive the urgency indicator information directly from the diagnostic tool 100 via the wireless connection 430 or through the wired connection at the data link connector.

The diagnostic tool 100 may convey the urgency indicator information via the wireless connection 430 to the wireless device 400 for display on display 401 or to emit a sound through the wireless device's speakers or vibrate as described herein. In addition, the diagnostic tool can convey the urgency indicator information to the wireless device 400 via wireless connection 430 and in turn the wireless device 400 communicates wirelessly with the vehicle's audio and visual system 425 via a wireless connection 420. The vehicle's audio and visual system 425 may also be accessed via the electronic control unit or directly if it includes wireless communication components.

Thus, the urgency indicator information may be displayed on the display 401 and/or the display 506 to provide an alert message 500 containing text 502 regarding the urgency level as described herein. In other embodiments, the urgency indicator information may be conveyed to other system or device such as a light indicator or text message in a mirror (smart mirror), such as the rear view mirror 504 or side mirrors of a vehicle (not shown), a head up display HUD 512, a display in the instrument's panel 514 and the like. In addition or alternatively, the message can be a sound alert provided, for example, through vehicle's speakers (not shown) or a speaker forming part of the wireless device 400. As described herein, the urgency alert can be through vibration of seats, mirrors, steering wheel, displays, wireless device 400 or the diagnostic tool 100.

The alert message 500 may be in the form of a text message 502 displayed in one or more of the displays of the systems or devices described herein. The text may include the appropriate urgency alert level which can correspond to the indicators. For example, alert level 1 may be associated with a color for the indicator or an action message as described in other parts of the disclosure.

Figure 6:
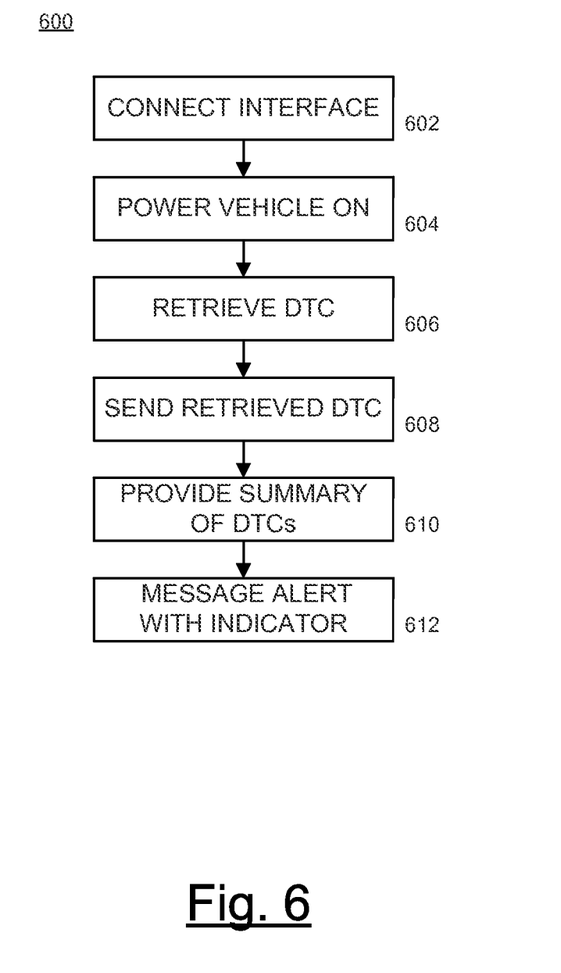
FIG. 6 illustrates a flow chart with exemplary method steps according to some aspects of the disclosure.

FIG. 6 illustrates method steps in a flow chart 600 that may be used to implement some aspects of the present disclosure. At step 602, the user connects the connector interface 124 to the vehicle's DLC. At step 604, the user turns on the vehicle, which can provide power to the diagnostic tool 100. In other embodiments, the power is provided by the diagnostic tool's 100 other power source. At step 606, the diagnostic tool 100 can automatically retrieve any DTCs that have been set in the vehicle. If the diagnostic tool 100 does not automatically read the DTCs from the vehicle, the user can manually press the "R" button to retrieve the DTCs. If the link fails or if there is no communication with the vehicle then a message can be displayed, such as "ERROR" or can toggle between the message "LINK" and "ERROR." At the step 608, the information for a summary screen 308 used to notify the user as to how many error codes were found or if none were found can be sent to an associated device to be projected in more or more displays 104. If no error codes were found, a message, such as "NO CODES" or no alert message 500 is conveyed to the user. At step 610, the user can view and/or listen to the various retrieved DTC by pressing a button in the associated user interface 106, or in some embodiments through voice activation. The DTC code can be delivered to the user through one or more of the associated displays and/or a speaker. Using the one or more interfaces, the user can then press, for example, "R" or "B" to continue to scroll to the next code, if any. Each DTC will have its own urgency level indicator that can be conveyed, at step 612, accordingly through the one or more associated displays and/or speakers. Additionally the alerts may be in the form of vibration.

The steps described in FIG. 3 or 6 or otherwise may be programmed into software stored on a memory or a computer or machine readable medium. For the purposes of this disclosure a computer readable medium stores computer data, which data can include computer program code that is executable by a processor 202 of the diagnostic tool 100 and/or associated device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

As previously mentioned, communication channels may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof In an aspect, the invention may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the invention, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:
   a processor that processes a diagnostic data from the vehicle;
   a memory that stores a database that is used to indicate a condition of the vehicle, wherein the database includes a plurality of stored diagnostic trouble codes (DTCs) and a level of urgency corresponding to each of the stored DTCs, wherein the corresponding level of urgency is determined from a pool of information related to vehicle service;
   a connector interface that connects the diagnostic tool to a data link connector in the vehicle;
   a signal translator that allows the diagnostic tool to communicate with the vehicle in at least one communication protocol;
   a wireless communication circuit configured to communicate with a wireless device; and
   a housing surrounding the processor, the memory, the connector interface, and the wireless communication circuit, wherein the wireless device is in communication with one or both of a display and a speaker in the vehicle to provide a user, an indicator that indicates the level of urgency corresponding to a retrieved DTC, and the indicator indicates an action corresponding to that level of urgency.

2. The diagnostic tool of claim 1, wherein the level of urgency informs the user when the vehicle should be serviced based on the stored DTC.

3. The diagnostic tool of claim 1, wherein the level of urgency includes three levels of urgency ranging from attention, caution and urgent repair needed.

4. The diagnostic tool of claim 2, wherein the level of urgency includes three levels of urgency ranging from a low level, a middle level and a highest level of urgency as to when the user should bring his vehicle in for repairs.

5. The diagnostic tool of claim 2, wherein the level of urgency includes three levels of urgency ranging from a low level, a middle level and a highest level of urgency to indicate to the user if the vehicle can still be driven without potential damage to the vehicle.

6. The diagnostic tool of claim 1 further comprising:
   a user interface that includes a read button that also acts as a first scroll button and a back button that also acts as a second scroll button.

7. The diagnostic tool of claim 3, further comprising:
   a user interface includes a read button that also acts as a first scroll button and a back button that also acts as a second scroll button.

8. The diagnostic tool of claim 1, wherein the display includes one or more displays of: a vehicle, a smart phone device, a global positioning system, a tablet, a personal laptop computer, and a PDA.

9. The diagnostic tool of claim 8, wherein the vehicle's display include one or more of: a vehicle's navigation screen, a head up display, a side mirror indicator, a rear view indicator, and an instrument panel indicator.

10. The diagnostic tool of claim 1, wherein the wireless communication circuit is configured to be in wireless communication with a vehicle's onboard computer.

11. A diagnostic tool for diagnosing a vehicle, comprising:
    a processor that processes a diagnostic data from the vehicle;
    a memory that stores a database that is used to indicate a condition of the vehicle, wherein the database includes a plurality of stored diagnostic trouble codes (DTCs) and a level of urgency corresponding to each of the stored DTCs;
    a connector interface that connects the diagnostic tool to a data link connector in the vehicle;
    a signal translator that allows the diagnostic tool to communicate with the vehicle in at least one communication protocol;
    a wireless communication circuit configured to communicate with an onboard computer system of the vehicle; and
    a housing surrounding the processor, the memory, the connector interface, and the wireless communication circuit, wherein the wireless communication circuit is in wireless communication with one or both of a display and a speaker in the vehicle to provide a user, an indicator that indicates the level of urgency corresponding to a retrieved DTC matching the stored DTC, and the indicator indicates an action corresponding to that level of urgency.

12. The diagnostic tool of claim 11, wherein the wireless communication circuit is also in communication with one or more of: a smart phone device, a global positioning system, a tablet, a personal laptop computer, and a PDA.

13. The diagnostic tool of claim 11, wherein the display includes one or more of: a vehicle's navigation screen, a head up display, a side mirror indicator, a rear view indicator, and an instrument panel indicator.

14. The diagnostic tool of claim 13, wherein the wireless communication is one of a personal area network (PAN) or a local area network (LAN) communication.

15. A method of indicating an urgency repair level of a vehicle, comprising:
    allowing a communication between a diagnostic tool and a data link connector in the vehicle, wherein the diagnostic tool communicates an indicator that indicates a level of urgency related to a repair condition of the vehicle based on stored diagnostic trouble codes (DTCs), the level of urgency determined from a pool of information related to vehicle service;
    retrieving DTCs stored in a vehicle diagnostic computer; and
    providing to a user, through one or both of a speaker and a display, the level of urgency of repair condition for each DTC retrieved that corresponds to the stored DTCs, wherein the level of urgency takes the form of multiple levels of urgency and the indicator also recommends an action corresponding to that level of urgency.

16. The method of claim 15, wherein the multiple levels of urgency includes three levels of urgency ranging from attention, caution and urgent repair needed.

17. The method of claim 15, wherein retrieving the DTC is automatic when the diagnostic tool is connected to the vehicle and the vehicle is powered on.

18. The method of claim 15, wherein when the retrieving step fails, the diagnostic tool will toggle between a first message and a second message on the display.

19. The method of claim 15, wherein the providing step further comprises one or both of displaying on the display and playing through the speaker the corresponding DTC with the urgency indicator.

20. The method of claim 15, wherein each DTC will have its own corresponding urgency indicator.

* * * * *